Figure 1:
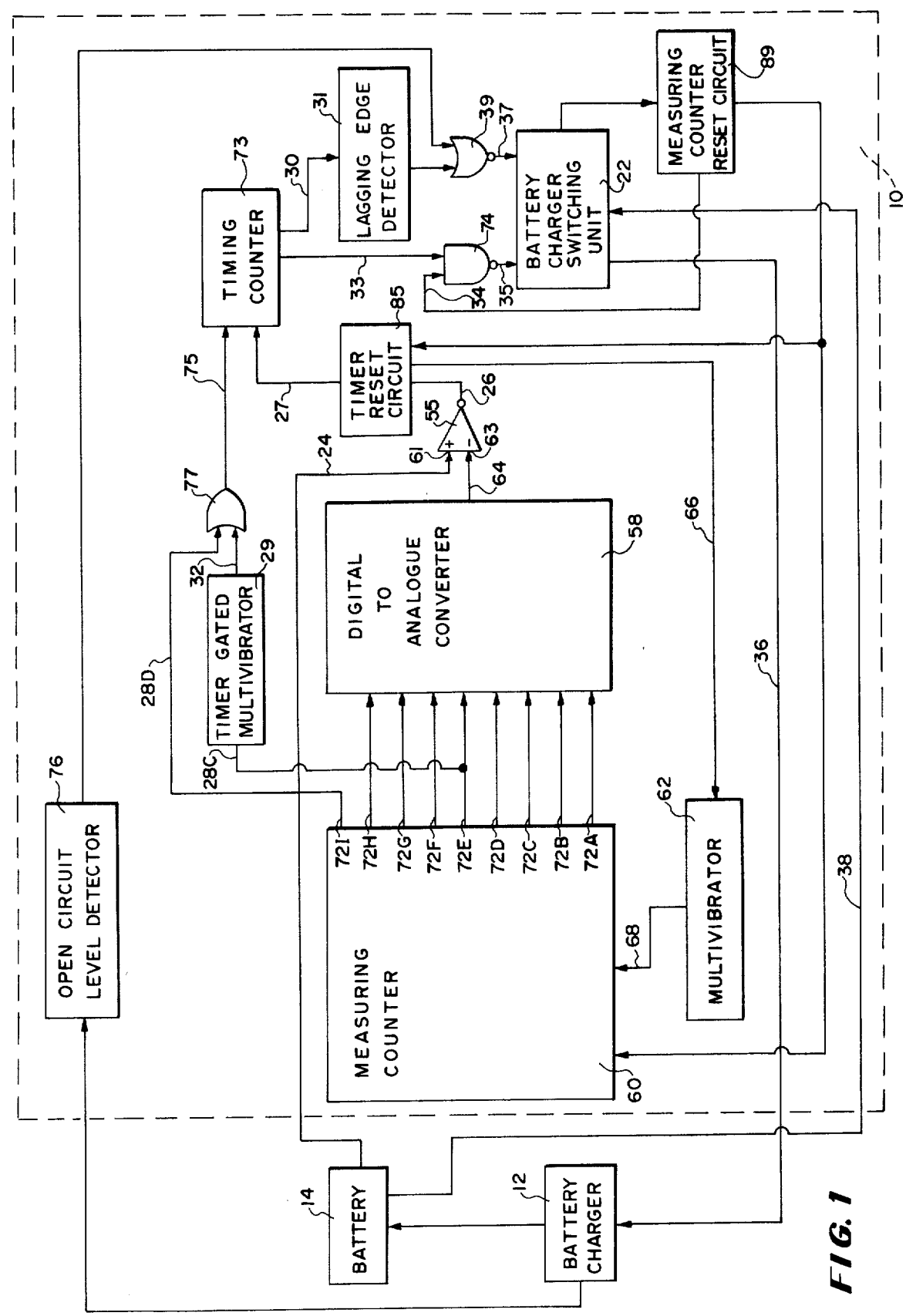

United States Patent [19]
Long

[11] 3,886,427
[45] May 27, 1975

[54] BATTERY CHARGER CONTROL CIRCUIT

[75] Inventor: Ronald Edwin Long, Lincoln, Nebr.

[73] Assignee: Lester Electrical of Nebr., Inc., Lincoln, Nebr.

[22] Filed: Jan. 2, 1974

[21] Appl. No.: 430,091

Related U.S. Application Data

[63] Continuation-in-part of Ser. No. 298,344, Oct. 17, 1972, Pat. No. 3,794,905.

[52] U.S. Cl. .................... 320/22; 320/37; 320/39
[51] Int. Cl. ............................................. H02j 7/04
[58] Field of Search ............ 320/22, 39, 40, 43, 48, 320/37, 38

[56] References Cited
UNITED STATES PATENTS

| | | | |
|---|---|---|---|
| 3,781,631 | 12/1973 | Nelson et al. | 320/39 X |
| 3,794,905 | 2/1974 | Long | 320/39 X |

Primary Examiner—J. D. Miller
Assistant Examiner—Robert J. Hickey
Attorney, Agent, or Firm—Vincent L. Carney

[57] ABSTRACT

To periodically initiate a charging run during storage of the battery charger and battery for long periods of time, ten hertz clock pulses are applied to a first counter normally used to measure the potential of the battery and the output from the first counter is applied to a second counter normally used to measure the rate of change of the potential of the battery until a predetermined count is reached in approximately 2½ days, with the output from the second counter being used to initiate a charging cycle. To avoid relay contact chatter when the battery is disconnected from the battery charger, the rectified alternating current from the battery charger is applied to a circuit that generates a positive pulse which deenergizes the battery charger when the battery is disconnected from the battery charger.

15 Claims, 2 Drawing Figures

BATTERY CHARGER CONTROL CIRCUIT

This application is a continuation-in-part of U.S. Pat. application Ser. No. 298,344 to Ronald E. Long, filed on Oct. 17, 1972 and assigned to the same assignee, now U.S. Pat. No. 3,794,905, issued on Feb. 26, 1974.

This invention relates to apparatuses for controlling battery chargers.

One class of apparatus for controlling the operation of a battery charger includes a potential measuring counter that follows the potential of the battery that is being charged, increasing its count as the potential of the battery increases, and a timer that provides control signals when the time between counts of the counter meets certain predetermined criteria. A circuit for causing the potential measuring counter to follow the potential of the battery includes an analogue-to-digital converter that converts the count from the potential measuring counter to an analogue signal and a comparator that compares the signal of the digital-to-analogue converter with the potential of the battery, adjusting the count of the potential measuring counter in response to this comparison by energizing a multivibrator that applies pulses to the potential measuring counter so that the potential counter follows the potential of the battery in incremental steps. A charging run is terminated by this class of control apparatus when the rate of change of the charging of the battery falls within a predetermined range.

Apparatus for controlling a battery charger of this class has been proposed in which the timer is a low-rate-of-charging detector. When the rate of change of the potential of the battery falls below a predetermined rate, the low-rate-of-charging detector signals the battery-charger switching unit to deenergize the battery charger.

The potential-measuring counter is an MOS counter controlled by the circuit that causes the count to represent the potential of the battery. The timer (low-rate-of-charging detector) is an MOS binary ripple timing counter having a large number of stages to provide precision in measuring the time period required for the battery to increase in potential from one reference level to the other.

The proposed system is described in greater detail in co-pending U.S. Pat. application No. 298,344 to Ronald E. Long, filed Oct. 17, 1972, and assigned to the same assignee as this application, now U.S. Pat. No. 3,794,905 issued on Feb. 26, 1974.

In this system, a turn-on circuit is included which automatically starts a charging run whenever the battery potential falls below a predetermined potential during storage of the battery. This circuit is useful when the battery is to be stored for long periods of time. Batteries are stored for long periods of time, for example, when they are used to power certain types of vehicles such as golf carts in arctic or temperate zones where the golf carts may not be used during the winter months.

Although the proposed turn-on circuit operates fairly well, it has some problems. One problem is that certain batteries under certain conditions do not run through a charging cycle with sufficient frequency when they are stored for long periods of time and are therefore subject of sulfonation. This long period without charging occurs in some batteries under some circumstances because the potential is at a higher level during colder temperatures than during warm temperatures so that an extremely cold period of time may maintain the potential high for a long period of time. Moreover, some batteries have different voltage characteristics than others so the turn-on circuit runs some batteries through a charging run within a sufficiently short period to prevent sulfonation but not other batteries.

Another difficulty with the proposed circuit is that the relay contacts of relays that are utilized to energize and deenergize the battery charger are subject to chattering, causing excessive wear and pitting when the battery is disconnected from the battery charger because the battery charger control circuit reacts to the rectified battery charger potential by attempting to turn on and off as this potential fluctuates once the battery, which normally acts as a stabilizing potential, is removed from the battery charger.

Accordingly, it is an object of the invention to provide a novel apparatus for controlling a battery charger.

It is a further object of the invention to provide a control circuit for a battery charger which automatically initiates a charging run after a predetermined period of time.

It is a still further object of the invention to provide a control circuit for a battery charger which quickly turns the battery charger off when the battery is disconnected from the battery charger.

It is a still further object of the invention to provide a control circuit for a battery charger in which relay contact chatter is prevented.

In accordance with the above and further objects of the invention, there is provided an apparatus for controlling a battery charger having a measuring counter driven by a multivibrator, a digital-to-analogue converter for converting the count of the measuring counter to a potential, a comparator for comparing the potential from the digital-to-analogue converter with the potential of the battery being charged, and a timing counter controlled by the comparator for deenergizing the battery charger when the rate of charging is below a predetermined rate.

As the potential of the battery increases during charging, a higher potential is applied to the comparator from the battery. When the battery potential is above the potential provided to the comparator by the digital-to-analogue converter, the comparator energizes the multivibrator to increase the count on the measuring counter until the digital-to-analogue converter provides a same or greater potential to the comparator than the battery provides.

Each step in the potential caused by the measuring counter counting one bit position is considered a reference potential level. Each time the reference potential level is exceeded by the battery potential, a reset pulse is applied to the timing counter. When the time between reset pulses applied to the timing counter is within a predetermined range of lengths of time which are sufficiently long to indicate that the rate of charging of the battery has fallen to a predetermined low rate, the timing counter energizes a switching circuit which deenergizes the battery charger, thus ending the charging run.

After a charging run has been completed, if the battery remains unused, additional charging runs may be manually started by depressing a button. If a predetermined period of time such as 2½ days elapses without a charging run, a charging run is automatically initiated to maintain a charge on the battery and to prevent sulfonation.

To measure the period of time before a charging run is initiated, the multivibrator that normally applies pulses to the measuring counter during a charging run when the battery potential exceeds the reference level continues to apply pulses to the measuring counter while the battery charger is deenergized.

During this time, the measuring counter counts upwardly at a 10 hertz rate to its last output which is 4096 counts from its first output. This highest order output applies a pulse to the timing counter which counts upwardly to 512 counts which is equivalent to 2,097,152 counts of the measuring counter to provide approximately a two and one-half day period of time. The output from this highest order count reenergizes the battery charger to start a charging run.

To prevent relay contact bounce or chatter when the battery is disconnected from the battery charger, the alternating current from the battery charger is passed through a pulse shaper to provide a negative pulse which quickly deenergizes the battery charger before substantial relay chattering occurs.

From the above description, it can be seen that the battery charger control apparatus of this invention has the advantages of: (1) preventing sulfonation by periodically initiating a charging run after a period of time controlled by counters and circuitry normally used for other purposes during a charging run; and (2) preventing contact bounce or chatter which would reduce the life of the relays within the battery charger.

Figure 2:
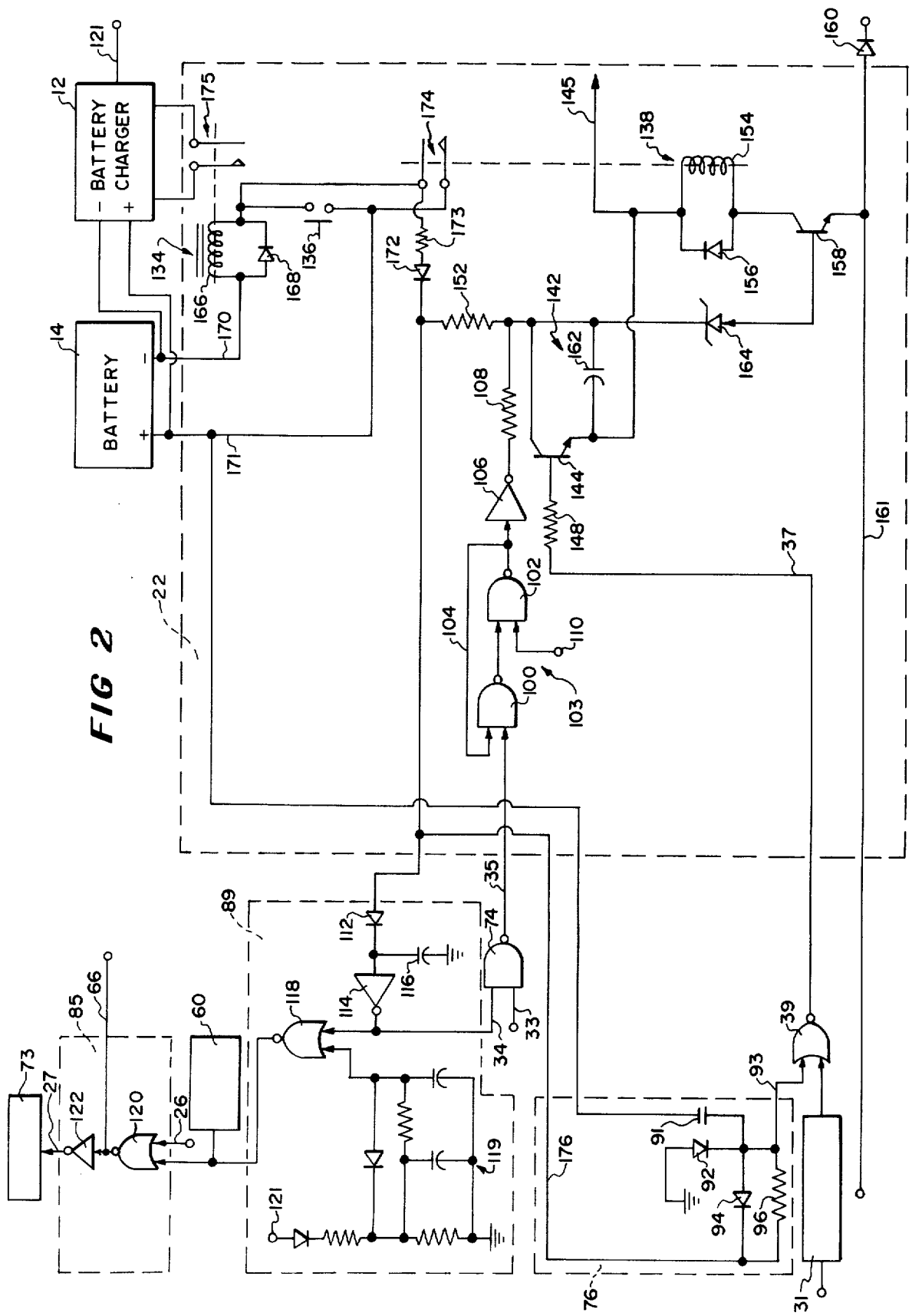

The above and further features of the invention will be better understood from the following detailed description when considered with reference to the accompanying drawings, in which:

FIG. 1 is a block diagram of a battery charger control circuit, battery charger and battery in accordance with an embodiment of the invention; and FIG. 2 is a schematic circuit diagram of a portion of the battery charger control circuit shown in FIG. 1 in accordance with an embodiment of the invention.

GENERAL STRUCTURE

In FIG. 1, there is shown a battery charger control circuit 10, a battery charger 12 and a battery 14, each being electrically connected to the other. The battery charger control circuit 10 includes circuitry that senses the electrical potential, and deenergizes the battery charger 12 when the battery 14 is fully charged.

In the preferred embodiment, the battery charger 12 and the battery-charger control circuit 10 are of the type used to charge battery powered vehicles such as golf carts and the like. This type of battery charger and battery-charger control circuit is described in greater detail in co-pending U.S. Pat. application No. 298,344 filed Oct. 17, 1972 by Ronald E. Long and assigned to the same assignee as this application, now U.S. Pat. No. 3,794,905 issued on Feb. While the battery charger 12 and battery-charger control circuit 10 are primarily intended to charge batteries for battery-powered vehicles, they may also be used to charge other types of batteries.

To control the battery charger 12, the battery-charger control circuit 10 includes a measuring counter 60, a multi-vibrator 62, a digital-to-analogue converter 58, a comparator 55, a timing counter 73 and a battery charger switching unit 22.

The measuring counter 60, digital-to-analogue converter 58, multivibrator 62 and comparator 55 measure the potential of the battery 14 and supply digital information concerning changes in the potential level of the battery as it changes from one potential reference level to another to the timing counter 73. The timing counter 73 is electrically connected to the battery charger switching unit 22 to provide signals thereto in response to which the battery charger switching unit 22 prevents the battery charger 12 from applying further substantial charge to the battery 14 after the battery 14 is fully charged as indicated by a final low rate of change of the battery potential, which low rate of change is indicated by the time it takes for the battery potential to increase from one reference level to another.

The control circuit 10 also includes circuitry, described in greater detail in the aforementioned patent to Ronald E. Long and not described herein, which circuitry receives signals on any of several different conductors from the measuring counter 60, and, in response to the signals and to internally-generated logic, applies output signals to either the timing counter 73 or to the battery charger switching unit 22 to perform any of several functions, such as: (1) deenergize the battery charger 12 if the potential of the battery 14 rises above a maximum potential; (2) select a time base for detecting a low-rate-of-change of potential; (3) provide stand-by protection for long periods of power shutdown time; and (4) decode the output of the timing counter 73 at certain times when the output is in a coded form not suitable for use with the circuitry to which it is being transmitted.

To energize and deenergize the battery charger 12, the battery charger switching unit 22 includes switches which are controlled in response to signals received over conductor 37 from the NOR gate 39 and over conductor 35 from NAND gate 74, the control over the battery charger being indicated by the line 36 connecting the battery charger 12 and the battery charger switching unit 22. The battery charger switching unit 22 also receives the potential of the battery 14 through conductor 38, which potential serves as a reference and a source of power for certain switching operations within the battery charger switching unit 22.

While in the preferred embodiment, the battery charger control circuit 10 senses the potential of the battery 14 and controls the battery charger 12 in accordance with the sensed potential, it is also possible to construct a battery charger control circuit which operates in accordance with the principles of this invention but senses the charging current instead of the potential of the battery 14. The changes necessary in the preferred embodiment to enable the battery charger control circuit to operate by sensing the charging current rather than the potential of the battery 14 are known to persons skilled in the art so that a person skilled in the art would be able to make such changes from the description provided herein.

The timing counter 73 has a reset terminal electrically connected to the conductor 27, a count input terminal electrically connected to the conductor 75, a start-cycle output terminal electrically connected to the conductor 33, and a deenergized battery charger output terminal electrically connected to the conductor 30. In the preferred embodiment, the timing counter 75 is an MOS counter having 12 stages.

When the timing counter 73 is counting during a charging run, 1.72 hertz pulses are applied to its count input terminal through the conductor 75, causing it, unless reset by a positive pulse on conductor 27, to provide an input pulse to its deenergized battery charger output terminal and to the conductor 30 forty minutes after starting a count. With this mechanization, the counter 73 measures the time between reset pulses and the time required for the battery potential to increase one potential reference level, providing a signal to deenergize the battery charges when this time becomes large enough to indicate a rate of charging that is less than a predetermined rate. A second deenergized battery charger output terminal may be used to terminate a charging run at a higher rate of charging, such as after five minutes from the start of a run, for batteries which are only lightly discharged at the start of the charging run as described in the aforementioned United States patent to Ronald E. Long.

To generate reset pulses each time, the potential of the battery increases above the last potential reference level, the operational amplifier 55, which serves as a comparator, has one of its input terminals 61 electrically connected to a conductor 24 to receive the potential of the battery 14 and the other of its input terminals 63 electrically connected to the output of the digital-to-analogue converter 58 through a conductor 64.

The potential reference levels are discrete amplitudes of potential, spaced apart from each other by predetermined increments of potential. The potential reference level at any one time is the last battery potential of one of the spaced-apart increments. In the preferred embodiment, a potential increment of 0.012 volts is selected so that the distance from one potential reference level to the other is 0.012 volts. There are approximately 1024 potential reference levels in a typical battery charging run in the preferred embodiment. However, for other types of batteries, other applications, and other conditions of charging the batteries, there may be more or fewer potential reference levels.

To provide the reference levels, the counter 60 includes a plurality of output terminals, terminals 72A-72I being shown in FIG. 1 as examples, with certain output terminals being electrically connected to different inputs of the digital-to-analogue converter 58 so that the count of the counter 60 causes the digital-to-analogue converter 58 to apply a potential level to the input 63 of the comparator 55, which potential linear level is equivalent to the count of the counter 60.

The count on the counter 60 is increased whenever the battery potential on conductor 24 rises above the last reference applied to the conductor 64, resulting in the energization of the multivibrator 62 through the conductor 66. Under these circumstances, the multivibrator 62 generates pulses that are applied to the counter 60 through the conductor 68, causing the count on the counter 60 to increase. When the count of the counter 60 increases, new reference levels are obtained at the output of the digital-to-analogue converter 58 until the potential at input 63 equals or is greater than the potential at input 61, in which case the output of the comparator 55 is zero, thus stopping the multivibrator 62.

The output terminals 72A-72I of the counter 60 provide a signal at any one time indicating the next higher reference level from the last level through which the battery potential has passed during the charging run. These signals therefore give an indication of the battery charging potential which may be used for many purposes, one of which is to control the internal logic within the battery charger and control apparatus 10.

One important logic function that may be controlled is the starting of a charging operation after the battery 14, battery charger 12 and battery charger control circuit 10 have been connected without the battery 14 being used for a long period of time such as 2½ days, which may occur during storage of battery-powered vehicles such as golf carts. Other functions are described in the aforementioned United States patent to Ronald E. Long.

To apply a potential to the positive input of the operational amplifier 55 that corresponds to the last reference level established by the counter 60, the digital-to-analogue converter 58 includes a plurality of input terminals, each electrically connected to a different one of the output terminals of the counter 60. The digital-to-analogue converter 58 converts the digital signals received from the counter 60 into a corresponding potential level and applies this potential level to the negative input level of the operational amplifier 55 through the conductor 64. In the preferred embodiment, the digital-to-analogue converter 58 is a resistor ladder type of converter but other types are, of course, usable with the proper modification.

To apply a 1.72 hertz counting pulse to the timing counter 73, a timer gated multivibrator 29 has its input electrically connected to the output terminal 72E of the counter 60 through a conductor 28C, which conductor receives a signal from output terminal 72E of the counter 60 when the potential of the battery reaches the level of 39.7 volts. In response to this signal the timer gated multivibrator 29 is energized and applies 1.72 hertz pulses to the timing counter 73 through the conductor 32, the OR gate 77, and the conductor 75.

To prevent the battery from becoming completely discharged when stored for a long period of time, the measuring counter 60 and the timing counter 73 cooperate after a charging run has ended to measure a 2½ day time period, after which, the battery charger switching unit 22 is caused to initiate another charging run.

To periodically start a charging run during storage, the output signal from terminal 72I provides a signal pulse to the timing counter 73 to cause the timing counter 73 to count upwardly by one count each time the measuring counter 60 is counted from its lowest order to its highest order output terminal, with an output from the timing counter 73 being applied to the battery charger switching unit 22 to energize the battery after approximately 2½ days of storage of the battery charger 12 and battery charger control circuit 10.

To count the counter 60 to its highest order output after a charging run has been completed, the multivibrator 62 continues to provide 10 hertz pulses through conductor 68 to the counter 60, causing it to count up to terminal 72I, which applies a pulse to the conductor 28D and resets the counter to repeat the cycle periodically.

To count the timing counter upward during storage, the pulses on conductor 28D are applied through OR gate 77 and conductor 75 to the count terminal of the timing counter 73 to cause the timing counter to count upwardly in the same manner as it counts during a charging run, but the frequency is much slower since the pulses are applied to it from the conductor 28D only once for each complete cycle of the measuring counter 60. When the timing counter 73 is counted to the output terminal at count 512, a pulse is applied to the NAND gate 74 through the conductor 33, resulting in a pulse being applied to the battery switching unit 22, causing it to initiate a charging run in the manner to be described in greater detail hereinafter.

To turn off the battery charger switching unit 22 quickly to avoid relay contact bounce, the battery charger control circuit 10 includes an open circuit level detector 76 which generates a pulse upon the disconnection of the battery from the battery charger and applies it to the NOR gate 39 which applies it, in turn, through the conductor 37 to the battery charger switching unit 22, causing the battery charger switching unit 22 to quickly deenergize the battery charger 12 in a manner to be explained more fully hereinafter.

STRUCTURE OF OPEN CIRCUIT LEVEL DETECTOR AND TURN-ON CIRCUIT

In FIG. 2, there is shown a schematic circuit diagram of the battery charger unit 22, the open circuit level detector 76, the reset circuit 85 for the timing counter 73 and the reset circuit 89 for the measuring counter 60. The battery charger switching unit 22 includes a power control relay 134, a manual switch 136, a control relay 138, and a main logic switch 142.

The battery charger 12 is deenergized whenever a signal is received on the conductor 37 through the NOR gate 39 from either the lagging edge detector 31 at the end of a charging run or from the open circuit level detector 76, occurring when the battery 14 is disconnected from the battery charger 12.

To deenergize the battery charger 12 when a signal is received over the conductor 37, the main logic switch 142 includes an npn transistor 144 having its base connected to the conductor 37 through a resistor 148. To provide a potential to the collector of the transistor 144, the collector is connected to a source of positive potential through a resistor circuit 152.

To control the main power relay 134 in response to control signals from the main logic switch 142, the control relay 138 includes a relay coil 154 shunted by a diode 156 and connected at one end to the collector of an npn transistor 158, the emitter of the transistor 158 being connected to the source of negative potential from the battery through a diode 160. The other end of the relay coil 154 is connected to the emitter of the transistor 144, to a source of positive potential 145 and to one plate of a capacitor 162, the other plate of the capacitor 162 being electrically connected to the collector of the transistor 144. A zener diode 164 has its cathode electrically connected to the collector of the transistor 144 and to one plate of the capacitor 162 and has its anode electrically connected to the base of the transistor 158.

To energize or deenergize the battery charger 12, the main power relay circuit 134 includes a coil 166 shunted by a diode 168, with the coil 166 being connectable at one end to a source of negative potential on conductor 170 and at the other end to a source of positive potential on conductor 171 through a pair of normally open contacts 174 controlled by the control relay 138, one contact of the pair of contacts 174 and the one end of the coil 166 being connected to the anode of the blocking diode 172 through a current limiting resistor 173 which drops the battery potential to the logic level. The one contact of the relay is electrically connected to one of the fixed contacts of the manual switch 136 and to a source of positive potential, the other fixed contact of the manual switch 136 being connected to the one side of the coil 166, with the moving contacts of the manual switch connecting these two contacts when depressed. When energized, the coil closes the contacts 175 of the power relay 134 to energize the battery charger 12.

To provide a potential to circuit elements only when the battery charger is energized, the cathode of the blocking diode 172 is connected to the resistor circuit 152 and one power bus for the battery charger control circuit 10 and the anode of the diode 160 is connected to another power bus 161 for the battery charger control circuit 10.

When the battery 14 is disconnected from the battery charger control circuit 10 and the battery charger 12, there is a tendency for the contacts of the relays 134 and 138 bounce or chatter because the circuit sees the rectified voltage across conductors 170 and 171 from the battery charger 12, which appears as a fluctuating voltage. The battery charger control circuit attempts to turn on and off as the peaks and valleys of this alternating current voltage occur. While the battery is connected, the bounce or chatter does not occur because the terminals of the battery hold the conductors 170 and 171 at a constant d.c. potential.

To reduce the chatter of the relay contacts and therefore lengthen the life of the apparatus, the open circuit level detector 76 includes a capacitor 91 having one plate electrically connected to the conductor 171, which normally is connected to the positive terminal of the battery 14, and having its other plate connected to the input of the NOR gate 39 through a conductor 93. A first diode 92 has its cathode electrically connected to the conductor 93 and its anode connected to ground to clip the negative excursions from the battery charger. A second diode 94 has its anode electrically connected to the conductor 93 and its cathode electrically connected to the conductor 176 to clip positive excursions from the battery charger at a safe level for the logic circuit, with a resistor 96 being in parallel with the second diode 94.

With these connections, the rectified d.c. potential passes through the capacitor 91 and creates a positive pulse on the conductor 93 which is connected to a particular one of the two inputs to the NOR gate 39 when the battery is disconnected, which positive pulse is applied to the base of the transistor 144, driving it to its conductive state so as to drive the transistor 158 to a nonconductive state and deenergize the relay 138 to open the contacts 174, thus deenergizing the relay 134. This quickly deenergizes the battery charger 12 by disconnecting the power through the relay contacts 175 and therefore prevents relay contact chatter. The lagging edge detector 31 is connected to the other input of the NOR gate 39 to deenergize the battery charger at the end of a charging run.

To periodically start a charge cycle when the battery, battery charger and battery charger control circuit are stored for long periods of time without the battery being used, reset circuits reset the measuring counter 60 and the timing counter 73 at the end of each charging run. The multivibrator 62 (FIG. 1) that applies pulses to the measuring counter 60 continues to be energized to provide pulses to the measuring counter after the charging run, with the measuring counter 60 and the timing counter 73 being connected so that one count is applied to the timing counter each time the measuring counter is counted to its highest order. When a predetermined count is reached on the timing counter, an output potential of the timing counter 73 is applied to the battery charger switching unit 22 to start a charge cycle.

To reset the measuring counter 60, the measuring counter reset circuit 89 includes a diode 112, an inverter 114, a capacitor 116, a capacitor filter and rectifier circuit 119, and a NOR gate 118. One plate of the capacitor 116 is grounded and the other is connected to the input of the inverter 114 and to the cathode of the diode 112, the anode of the diode 112 being electrically connected to the cathode of the diode 172 which maintains a reference voltage level when the battery charger is performing a charging run, the reference voltage being obtained by dropping the battery potential in resistor 173.

To apply a negative output to the measuring counter 60 during a charging run, a first of the two inputs of the NOR gate 118 is connected to the a.c. side of the secondary of the transformer within the battery charger 12 at 121 through the filter and rectifier circuit 119 and the second of the two inputs of the NOR gate 118 is connected to the output of the inverter 114. During a charging run filtered positive potential is applied to the first input of the NOR gate 118 by the filter and rectifier circuit 119 and a negative potential is applied to the second input of the NOR gate 118 by the inverter 114, resulting in a negative output to the measuring counter 60 and to the NOR gate 120 of the reset circuit 85 for the timer 73.

A positive reset pulse is applied to the measuring counter 75 at the end of a charging run by this circuit because the potential at point 121 falls to ground rapidly as the battery charger 12 is deenergized at this time while the potential at the input of inverter 114 remains positive, being held at a positive potential by the stored charge on the capacitor 116 even though the potential at the cathode of diode 172 also falls at this time. Accordingly, the first input to NOR gate 120 receives a negative potential from the filter and rectifier circuit 119 and the second input to this gate receives a negative potential from the inverter 114, resulting in a positive output potential for a time.

When the capacitor 116 is discharged, the inverter 114 receives a negative input, resulting in a positive potential on the second input of NOR gate 118 while the first input receives a negative input, thus causing the NOR gate 118 to provide a negative output to counter 60 during the two and one half day period before automatic turn-on so that the counter 60 counts during this time. These potentials are also applied to the NOR gate 120 of the timer reset circuit 85.

The input pulse to the diode 112 that initiates a reset operation in the reset circuits 89 and 85 is applied from the cathode of the diode 172 whenever the relay contacts 174 are opened at the end of a charging run. With this connection, the measuring counter 60 and the timing counter 73 are each reset at the end of every charging run by their respective reset circuits 89 and 85. When the timing counter 73 is reset by a pulse on conductor 26 or from NOR gate 118, the inverted output from NOR gate 120 is applied to the multivibrator 62 (FIG. 1) from conductor 66 (FIGS. 1 and 2) to trigger this multivibrator and begin counting on counter 60.

To start a charging run when two and one-half days have elapsed after a previous charging run, the battery charger switching unit 22 includes a latch 103 having its input connected to the output of the NAND gate 74 and having its output connected through an inverter 106 and a resistor 108 to the collector of the transistor 144 in the switch 142. The latch 103 includes first and second two-input NAND gates 100 and 102, with one of the inputs of the NAND gate 100 being connected to the output of the NAND gate 74 through the conductor 35, the other input of the NAND gate 100 being connected to the output of the NAND gate 102, one input of the NAND gate 102 being connected to the output of the NAND gate 100 and the other input of the NAND gate 102 being connected to receive reset pulses on terminal 110 from conductor 27, which are the same reset pulses that are applied to the timing counter 73 so that the latch 103 is reset each time a reset pulse is applied to the timing counter 73 at the end of a charging run or when the battery potential exceeds a reference level.

With this circuit, a pulse is applied by the timing counter 73 to one of the two inputs of the NAND gate 74, which, when receiving an input pulse from the inverter 114 indicating that a battery charging run is not in progress, applies a negative input to the NAND gate 100 resulting in a positive output being applied to the NAND gate 102 which latches through the conductor 104 to provide a static potential to the inverter 106. The output of the inverter 106 is a static positive pulse that is applied to the collector of the transistor 144 through the resistor 108, driving this transistor into its nonconducting state to cause the transistor 158 to conduct. When the transistor 158 conducts, the relay 138 is energized so as to close its contacts 174 and energize the power relay 134, thus initiating a charging run.

OPERATION

The battery charger 12 is energized before the battery 14 is connected to it, with the connector through which electrical connection is made to the battery 14 also including the necessary conductors to electrically connect the battery control unit 10 to the battery.

In the operation of the battery charger when the battery 12 is connected to the battery 14, a negative potential is applied to conductor 170 and a positive potential to the conductor 171 (FIG. 2) and the point 145. The positive potential applied at 145 establishes a reference potential at the cathode of the diode 172 which applies a potential through the zener diode 164 to the base of the transistor 158, causing a conduction path from the source of positive potential 145 through the coil 154 of the relay 138 and the transistor 158 to energize the control relay 138. When the control relay 138 is energized, the contacts 174 are closed to energize the winding of the relay 134. When the relay 134 is energized, the contacts 175 are closed to energize the battery charger 12.

During the charging of the battery, the battery potential is measured and, when it reaches a predetermined potential above a low rate of charging region of the battery, the timing counter 73 begins to detect the rate of change of potential of the battery until, when the battery is fully charged, the rate of charging falls below a predetermined minimum rate of change, at which time, the charging run is terminated.

To measure the battery potential, the counter 60 (FIG. 1) counts upwardly to a value equaling the potential of the battery and follows the potential of the battery in increments step-by-step as it increases, with an output signal being applied to the output conductor 26 each time the potential of the battery increases above the last potential reference level established by the counter 60.

To cause the counter 60 to count to the reference level just above the potential of the battery, the battery potential is applied to the non-inverting terminal 61 of the operational amplifier 55 where it is compared to the output potential from the digital-to-analogue converter 58, which output potential is applied to the inverting terminal 63 through the conductor 64.

At the start of a charging run, the digital-to-analogue converter 58 has a low potential output so that the comparator 55 provides a positive output to the multivibrator 62 which, in response, applies a series of clock pulses to the input terminal of the counter 60 through the conductor 68, which clock pulses cause the counter 60 to count upwardly.

To supply an analogue potential to the inverting terminal 63 of the comparator 55, the digital-to-analogue converter 58 receives the digital count from the counter 60 and converts it to an equivalent analogue value. In this manner, the comparator 55 continually compares the potential of the battery with the analogue representing the last reference level established by the counter 60, with the battery potential being applied through the conductor 24 and the reference potential level being applied through the conductor 64 to the comparator 55.

The timing counter 73 is in its reset condition at the beginning of a battery charging run. At this time, no counting pulses are applied to the input of the timing counter 73 through the conductor 32. This avoids having the timing counter 73 begin counting while the potential applied to the comparator 55 from the battery 14 is rising with a low rate of change of potential at the very beginning of a charging run, thereby avoiding an early termination of the charging run.

When the potential of the battery passes through a predetermined reference potential level, which is 39.7 volts in the preferred embodiment, the counter 60 energizes the output terminal 72E which applies an output potential through conductor 28C to the timer-gated multivibrator 29, which in turn, applies 1.72 hertz pulses to the input of the counter 73 through the conductor 32, causing it to count upwardly. Each time the battery potential exceeds a potential reference level established by the counter 60 by a predetermined amount, a positive reset pulse is applied to the reset terminal of the timing counter 73 through the conductor 27, resetting the timing counter.

The timing counter 73 applies a signal to the output terminal connected to the conductor 30 40 minutes after the last reset pulse, which is when a count of 4096 is reached. This signal is applied to the battery charger switching unit 22 through the lagging edge detector 31 and the NOR gate 39, which signal causes the battery charger switching unit 22 to de-energize the battery charger 12.

The battery charger switching unit 22 operates in the same manner whether a signal from the lagging edge detector 31 or a signal from the open circuit level detector 76 is applied to the conductor 37 through the OR gate 39. In each case, the battery charger switching unit 22 de-energizes the battery charger 12 by first de-energizing the control relay 138 (FIG. 2), and then, as a result of the de-energization of the control relay 138, de-energizing the power relay 134.

To de-energize the control relay 138 whenever a positive signal is applied to the conductor 37, the transistor 144 is driven into conduction by the current flowing from its base to its emitter, causing the potential at the cathode of the zener diode 164 to fall to the level of source 145, switching off this zener diode. When the zener diode 164 is non-conducting, the transistor 158 is biased onto its non-conductive state, deenergizing relay 138.

When the control relay 138 is deenergized, the normally open contacts 174 of the control relay 138 are opened, thus breaking the circuit through the coil 166 of the power relay 134. When the circuit through the coil 166 is broken, the normally-open contacts of the power relay 134 are permitted to open, thus deenergizing the battery charger 12.

When the battery charger 12 is deenergized, the measuring counter 60 and the timing counter 73 are reset by the reset circuits 89 and 85 respectively.

To reset the measuring counter 60, the reset circuit 89 senses the drop in potential at the cathode of the diode 172 when the battery charger is deenergized and applies a reset pulse to the counter 60 in response to it.

To sense the drop in potential of the cathode of the diode 172, the capacitor 116 is charged until the battery charger 12 is deenergized and then begins to discharge, resulting in a negative pulse at the input of the inverter 112 and a positive pulse at its output, which positive pulse is applied to the input of the NOR gate 118, resulting in a positive output pulse being applied to the measuring counter 60 from the output of the NOR gate 118 to reset the counter 60.

To reset the timing counter 73, the reset circuit 85 senses the reset pulse applied by the NOR gate 118 to the reset input terminal of the measuring counter 60, and applies a positive pulse to the reset terminal of the timing counter 73 in response to it.

To sense the reset pulse applied to the reset terminal of the timing counter 60, the output of the NOR gate 118 is applied to one input of the NOR gate 120, the output of which is applied through the inverter 122 to the reset terminal of the timing counter 73 so that the reset terminal receives a positive pulse whenever a reset pulse is applied to the measuring counter 60.

After a charging run has been completed, and the battery charger deenergized, a new charging run may be started by depressing the push-button switch 136, which supplies a positive potential, when depressed, from conductor 171 through the diode 172 across the zener diode 164 to drive the transistor 158 into conduction, thus providing a path for current flow from the positive source 145 through the coil 154 of the relay 138 and the transistor 158. This current flow energizes the control relay 138, closing contacts 174 to energize the power relay 134 by permitting current to flow from the positive source 171 through the relay winding 166 to the negative source 170.

If a new charging run is not started manually and the battery charger and battery are left connected for an extended period of time, a new charging run is started automatically approximately every 2½ days. With this arrangement, if a battery such as one in a golf cart is left in storage, it will be periodically charged and thus maintained at a full charge with sufficient cycling to prevent sulfonation.

To time the 2½ days before the battery charger 12 is deenergized, the multivibrator 62 (FIG. 1) is connected by the conductor 66 to the output of the NOR gate 120 which provides an energizing voltage to the multivibrator 62 whenever the battery potential is higher than the output of the digital-to-analogue converter 58 or the comparator is deenergized. Since the comparator 55 is deenergized when the battery charger 12 is deenergized, the multivibrator 12 provides 10 hertz pulses to the measuring counter 60 through the conductor 68 during this time.

Output terminal 72I of the measuring counter 60 is energized each time the multivibrator 62 provides 4096 pulses to be counted by the measuring counter 60. When the terminal 72I is energized, a pulse is applied through conductor 28D to the count terminal of the timing counter 73 through the NOR gate 77 and the inverter 78, causing the timing counter 73 to count upwardly by one each time the multivibrator 62 applies 4096 bits to the measuring counter 60.

When the timing counter 73 counts to the battery output terminal 512 counts from the lowest order bit, which count on the timing counter 73 is equivalent to 2,097,152 counts on the measuring counter 60, the timing counter 73 applies a positive pulse to the NAND gate 74, which receives a pulse from the measuring counter reset circuit 89 (FIG. 1) at the same time, causing a negative pulse to be applied to the NAND gate 100 (FIG. 2). The NAND gate 100, in turn, applies a negative pulse to the NAND gate 102, which applies a positive output pulse to the NAND gate 100 and the inverter 106 to cause the collector of the transistor 144 to be pulled in a positive direction and to be latched in this state, resulting in transistor 144 becoming nonconducting. When the transistor 144 is nonconducting, a positive potential is applied to the base of the transistor 158, causing the winding 154 of the relay 138 to be energized.

When the winding 154 of the relay 138 is energized, the relay contacts 174 are closed causing the winding 166 of the relay 134 to be energized and the battery charger 12 to receive power and to start a new charging run.

When the battery 14 is disconnected from the battery charger 12, the rectified alternating current from the battery charger appears across the conductors 170 and 171 since the battery no longer maintains these conductors at a constant direct current potential difference. The rectified current is conducted through the capacitor 91 where it results in a positive potential being applied to one input terminal of the NOR gate 39, which causes the transistor 144 to become conductive, thus reducing the potential at the base of the transistor 158.

When the potential at the base of the transistor 158 becomes negative, the transistor 158 becomes nonconductive, causing the winding 154 of the control relay 138 to be deenergized. When the control relay 138 is deenergized, its contacts 174 open, causing the winding 166 of the power relay 134 to be deenergized. When the power relay 134 is deenergized, the contacts 175 open, deenergizing the battery charger 12.

With this arrangement, the relay contacts 175 and 174 are prevented from chattering when the battery is disconnected, which chatter would otherwise occur because the battery charger control circuit 10 would see the rectified a.c. potential from the battery charger and would attempt to open and close the relays in response to the rising and falling of this potential. The sharp positive pulse applied to the transistor 144 quickly deenergizes the battery charger 12 without any relay contact bounce.

From the above description, it can be understood that the battery charger of this invention has the advantages of: (1) recycling the battery charger 12 periodically during long periods of storage to maintain a charge on the battery and to prevent sulfonation; and (2) preventing the chatter of relay contacts when the battery is disconnected from the battery charger.

Although the preferred embodiment of the invention has been described with some particularlity, many modifications and variations are possible in the preferred embodiment without deviating from the invention. Accordingly, it is to be understood, that within the scope of the appended claims, the invention may be practiced otherwise than as specifically described.

What is claimed is:

1. Apparatus for controlling the charging of a battery, comprising:

input means for carrying a signal representing the potential of a battery;

measuring means for generating a plurality of energy-level digital signals indicating energy levels of the battery;

timer means for determining when the time between certain of said energy-level digital signals exceed a predetermined maximum time;

control means for selectively reducing and increasing the rate of charging of the battery;

said control means including logic means for causing said control means to reduce the rate of charging of the battery when said time between said certain energy-level digital signals exceeds said predetermined maximum time during a charging run;

said measuring means including a first counter and pulse-generator means for applying pulses to said first counter, whereby said first counter counts said pulses;

said first counter including a plurality of different order first output means;

said timer means including a second counter having an input terminal for receiving pulses for the counting thereof and a plurality of different order second output means;

one of the first output means of said first counter being connected to the input of said timer means, whereby said timer begins time periods under the control of said control means;

said control means including means for increasing the rate of charging of the battery when at least one of said first and said second counters counts to a predetermined one of said output means while said battery charger is not going through a charging run.

2. Apparatus according to claim 1 in which said control means includes:

battery charger means for applying charge to said battery at a predetermined rate;

hunting-prevention means for generating a signal when said battery is disconnected from said battery charger means and for rapidly terminating the application of charge at said predetermined rate in response to said signal.

3. Apparatus according to claim 2 in which said hunting-prevention means includes:
a capacitor having first and second plates, said first plate being connected to the output of said power supply;
switch means for reducing the rate of charging of said battery charger;
gating means operatively connected to said switching means;
said gating being connected to said second plate of said capacitor, whereby the rectified alternating current from said battery charger passes through said capacitor and causes said gate to enable said switching means.

4. Apparatus according to claim 3 in which said switch means further includes means for resetting said first and second counters when said rate of charging is reduced.

5. Apparatus according to claim 4 in which said measuring means further comprises:
a digital-to-analogue converter having an input electrically connected to said counter and an output whereby said output provides an analogue signal corresponding to the count of said counter;
a comparator having first and second inputs and an output;
said first input being adapted to be electrically connected to said battery;
said second input being electrically connected to the output of said digital-to-analogue converter; and
said pulse generator having an input and an output for applying said pulses to its output when a predetermined potential is applied to its input;
said input of said pulse generator means being electrically connected to the output of said comparator and said output of said pulse generator means being electrically connected to the input of said first counter.

6. Apparatus according to claim 5 in which:
said timer means further includes timer pulse-generator means for generating a plurality of pulses;
said timer pulse-generator means being electrically connected to the input of said second counter, whereby a signal on the output of said second counter indicates the time from the last output signal from said comparator to said measuring means during a charging run.

7. Apparatus for controlling the charging of a battery, comprising:
input means for carrying a signal representing the potential of a battery;
measuring means for generating a plurality of energy-level digital signals indicating energy levels of the battery;
timer means for determining when the time between certain of said energy-level digital signals exceeds a predetermined maximum time;
switch means for reducing the rate of charging of the battery when said time between said digital signals is above the predetermined maximum time;
battery charger means for applying a regular charge to said battery;
said battery charger means including terminal means for connection to the terminals of said battery and relay-contact means including relay contacts which cause said battery charger means to be energized when closed and cause said battery charger means to be deenergized when open;
hunting-prevention means for obtaining a signal from said battery charger means when said battery charger terminal is disconnected from said battery;
said hunting-prevention means being electrically connected to said battery charger and to said switch means;
said switch means including relay-solenoid means electrically connected to said hunting-prevention means for causing said relay-contact means to open so as to deenergize said battery charger upon receiving said signal.

8. Apparatus according to claim 7 in which said hunting-prevention means comprises:
a pulse shaping circuit;
a capacitor having first and second plates;
said first plate being electrically connected to said terminal;
said second plate being electrically connected to the pulse shaping circuit;
said pulse shaping circuit being electrically connected to the switch means, whereby said battery charger is deenergized upon the generation of a pulse from said anti-hunting means.

9. Apparatus according to claim 8 in which said measuring means comprises:
a counter;
a digital-to-analogue converter having an input electrically connected to said counter and an output, whereby said output provides an analogue signal corresponding to the count of the counter;
a comparator having first and second inputs and an output;
said first input being adapted to be electrically connected to said batteries;
said second input being electrically connected to the output of said digital-to-analogue converter; and
measuring-means pulse-generator means having an input and an output for applying a series of pulses to its output when a predetermined potential is applied to its input;
said input of said measuring-means pulse-generator means being electrically connected to the output of said comparator and said output of said measuring-means pulse-generator means being electrically connected to the input of said counter.

10. Apparatus according to claim 8 in which:
said timer means comprises:
a timer counter;
said timer counter having an input and at least one output;
timer pulse-generator means for generating a plurality of pulses;
said timer pulse-generator means being electrically connected to the input of said timer counter, whereby a signal on the output of said timer counter indicates the time from the last output signal from said comparitor to said measuring means.

11. Apparatus according to claim 1 in which said control means includes:
push-button means; and switch means for increasing the rate of the charging upon either the depressing of the push-buttom means switch or the reception of a predetermined output signal from said logic means.

12. Apparatus according to claim 11 in which said logic means further includes means for deenergizing portions of said timer means and measuring means and energizing other portions of said timer means and measuring means after said rate of charging has been decreased; said means for energizing, including means for energizing said first and second counters and said first pulse generator and deenergizing said second pulse generator.

13. Apparatus according to claim 12 in which said logic circuit further includes means connecting a certain output of said measuring counter to an input of said timing counter, whereby said timing counter counts one pulse upon said measuring counter counting to said certain output.

14. Apparatus according to claim 1 further including reset means for resetting said measuring counter at the end of a charging run.

15. Apparatus according to claim 14 further including second reset means for resetting said timer at the end of a charging run.

* * * * *